US008781869B2

(12) United States Patent
Cantor et al.

(10) Patent No.: US 8,781,869 B2
(45) Date of Patent: Jul. 15, 2014

(54) DETERMINING ESTIMATION VARIANCE ASSOCIATED WITH PROJECT PLANNING

(75) Inventors: Murray R. Cantor, Westwood, MA (US); Sunita Devnani Chulani, San Jose, CA (US); Paul M. Matchen, Mamaroneck, NY (US); Vadakkedathu T. Rajan, Briarcliff Manor, NY (US); Giuiseppe Valetto, New York, NY (US); Mark N. Wegman, Ossining, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 12/130,674

(22) Filed: May 30, 2008

(65) Prior Publication Data

US 2009/0299782 A1 Dec. 3, 2009

(51) Int. Cl.
*G06Q 10/00* (2012.01)

(52) U.S. Cl.
USPC ....... 705/7.12; 705/7.13; 705/7.17; 705/7.22; 705/7.37

(58) Field of Classification Search
USPC .............. 705/7.17, 7.21, 7.37, 80, 7.13, 7.15, 705/7.22, 7.23, 7.28, 7.11–7.42; 707/999.01; 703/1
See application file for complete search history.

(56) References Cited

U.S. PATENT DOCUMENTS

| | | | | |
|---|---|---|---|---|
| 6,381,580 | B1 * | 4/2002 | Levinson | 705/7.13 |
| 6,816,819 | B1 * | 11/2004 | Loveland | 703/1 |
| 7,062,449 | B1 * | 6/2006 | Clark | 705/7.15 |
| 7,324,954 | B2 * | 1/2008 | Calderaro et al. | 705/7.28 |
| 7,908,167 | B1 * | 3/2011 | Crum et al. | 705/7.42 |
| 8,155,996 | B1 | 4/2012 | Cassone et al. | |
| 8,280,756 | B1 * | 10/2012 | Kanemoto et al. | 705/7.12 |
| 2002/0082889 | A1 * | 6/2002 | Oliver | 705/8 |
| 2002/0143601 | A1 * | 10/2002 | Sinex | 705/9 |
| 2003/0229618 | A1 * | 12/2003 | Judy | 707/1 |
| 2004/0111306 | A1 * | 6/2004 | Yokota et al. | 705/7 |
| 2004/0148209 | A1 * | 7/2004 | Church et al. | 705/7 |
| 2005/0021384 | A1 * | 1/2005 | Pantaleo et al. | 705/9 |
| 2005/0234758 | A1 * | 10/2005 | Nishi | 705/8 |
| 2007/0260505 | A1 * | 11/2007 | Richardson et al. | 705/9 |
| 2008/0243575 | A1 * | 10/2008 | Weinberger | 705/8 |

OTHER PUBLICATIONS

Cantor, "Estimation variance and governance" IBM (Mar. 15, 2006), (http://www.ibm.com/developerworks/rational/library/mar06/cantor/).*
U.S. Official Action mailed Feb. 26, 2013 in related U.S. Appl. No. 13/588,698.

* cited by examiner

*Primary Examiner* — Sujay Koneru
(74) *Attorney, Agent, or Firm* — Scully, Scott, Murphy & Presser, P.C.; Daniel P. Morris, Esq.

(57) ABSTRACT

Method and system for determining estimation variance associated with project planning are provided. In one aspect, information associated with a project is obtained and initial estimations for the tasks in the project are determined using available information. The tasks are performed and actual measurements are obtained from the completed tasks. The actual measurements are used to revise the estimates of the remaining tasks. The revised estimates are used to compute a project level estimate and a variance on that estimate, and to enable better project management.

17 Claims, 2 Drawing Sheets

DETERMINING ESTIMATION VARIANCE ASSOCIATED WITH PROJECT PLANNING

CROSS-REFERENCE TO RELATED APPLICATIONS

This application is related to U.S. patent application Ser. No. 12/039,415, filed on Mar. 4, 2008, entitled "Risk Reduction", having a common assignee, which application is incorporated by reference herein in its entirety.

FIELD OF THE INVENTION

The present disclosure relates generally to determining and managing variances in project development life cycles by using updated and/or newly available information to reduce the variance in estimates.

BACKGROUND OF THE INVENTION

Accurate estimation of project parameters such as cost, schedule, or quality is an invaluable asset to a business. Estimating project parameters fairly accurately saves company's time, money, and enhances the company's goodwill and relationship with its customers. However, it is not an easy task to estimate an overall cost, schedule or quality of a project, especially a complex project involving multiple phases and components that depend on and/or interact with another.

A project life cycle is an ongoing process, in which sub-tasks complete and new information surfaces. Current approaches (e.g., COCOMO II, SLIM, SEER, Price-S) do not systematically update their estimates based on ongoing availability of information, nor do they actively reflect on the changes in variance that such updates provide. In sum, there is an inability to reflect on or consider the variance in the estimates and manage it effectively using new or updated information that becomes available as the project proceeds.

BRIEF SUMMARY OF THE INVENTION

Method, system and program storage device having instructions executable on a machine for determining estimation variance associated with project planning are provided. A method of determining estimation variance associated with project planning, in one aspect, may comprise obtaining information associated with a project. The project may comprise a plurality of tasks. The method may further include determining initial estimates and estimate variances of the plurality of tasks from the information, and obtaining actual measurements associated with a selected task from the plurality of tasks after said selected task is executed. The method may also include computing a difference between an initial estimate associated with the selected task and the actual measurements. The method may yet further include revising using the computed difference the initial estimates of remaining one or more tasks, and determining estimate variances of said remaining one or more tasks based on the revised estimates.

In another aspect, a method of determining estimation variance associated with project planning may comprise identifying a plurality of phases associated with a project, determining an initial estimate and variance associated with completing each of the plurality of phases. For each of the plurality of phases, the method may further include collecting actual measurements from one or more tasks executed as part of performing said each phase. The method may also include revising estimates and variances associated with completing rest of the plurality of phases based on the actual measurements, and determining an estimate and variance for the project based on the revised estimates.

A system for determining estimation variance associated with project planning, in one aspect, may comprise a processor operable to identify a plurality of tasks associated with a project and determine an initial estimate associated with completing each of the plurality of task. The processor is further operable to collect actual measurements resulting from executing one or more of the plurality of tasks and to revise one or more initial estimates associated with rest of the plurality of tasks not yet executed, based on the actual measurements. The processor is further operable to determine estimation and variance of the project based on the revised estimates.

A program storage device readable by a machine, tangibly embodying a program of instructions executable by the machine to perform above methods of determining estimation variance associated with project planning may be also provided.

Further features as well as the structure and operation of various embodiments are described in detail below with reference to the accompanying drawings. In the drawings, like reference numbers indicate identical or functionally similar elements.

DETAILED DESCRIPTION

A method and system for determining and managing the variance of project estimates are provided. The method and system of the present disclosure in one embodiment provide a way of computing the variance and managing the variance through the course of the project. Estimates are treated as random variables rather than discrete values, and are actively managed across the lifecycle of the project, rather than simply being computed at the beginning and referred to later in a static manner. Although the current description is specific to software development, the method is applicable to all kinds of project management and the description is not meant to suggest limitations to this applicability. Variance of a statistical estimate is computed as the average deviation of an estimate from its estimated mean. Variance for an estimate, thus, is a measure of uncertainty in the estimation. The variance may be equated to the risk associated with the project. Variance management is synonymous to management of risk associated with the project. The method and system of the present disclosure in one embodiment provides the estimation of mean and the associated variance not only during the planning phase of the project but also after completion of each task in the project.

Figure 1:
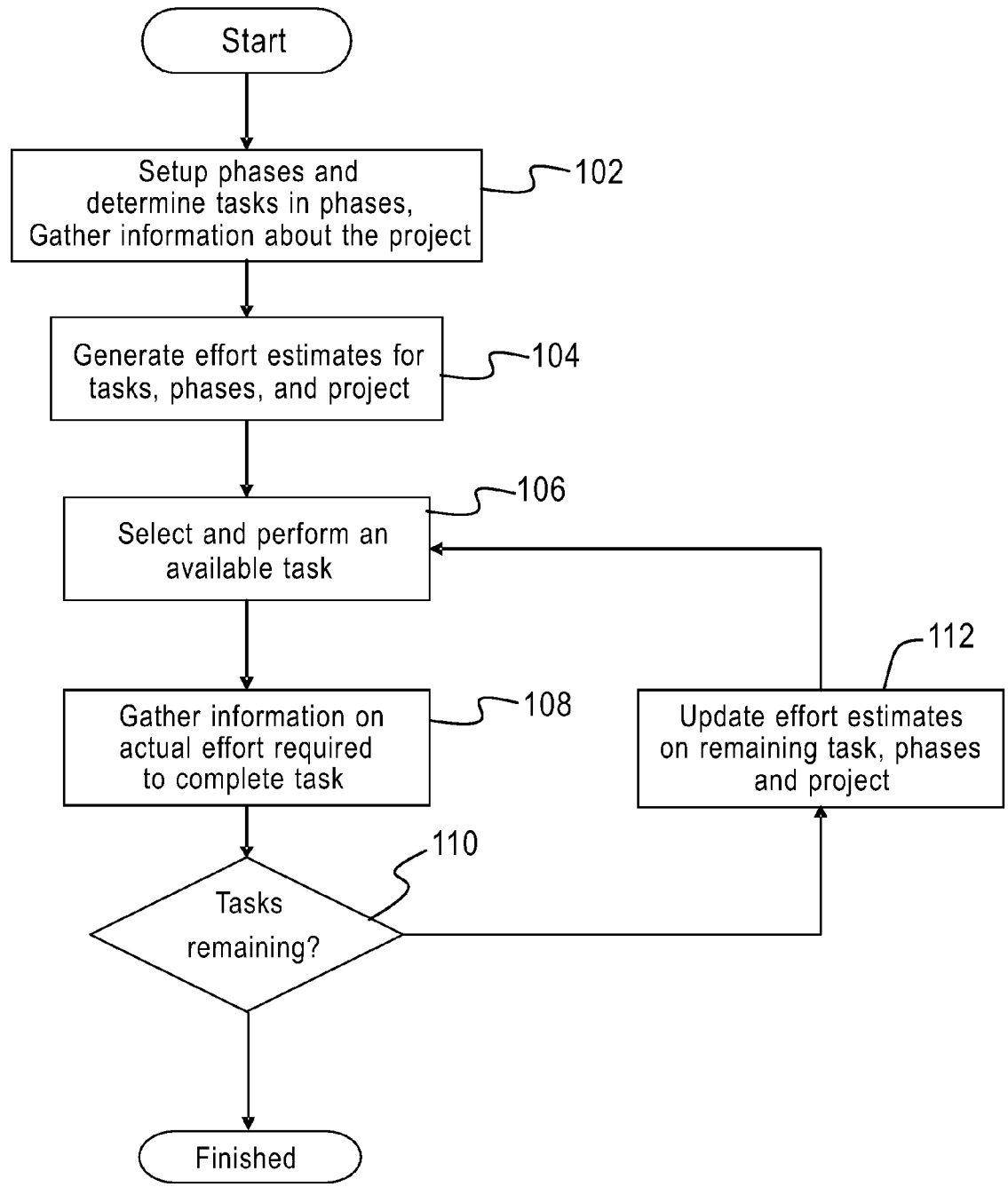
FIG. 1 is a flow diagram illustrating a method in one embodiment of the present disclosure for determining and managing the variance of an estimate on a product or project.

FIG. 1 is a flow diagram illustrating a method for determining and managing the variance of effort estimates on a project. A project starts with an initial planning activity. Information associated with the project is obtained. The information may include cost information, duration of the project or project schedule, as itemized or categorized into different tasks or phases, actual data associated with one or more past projects, including projects that produced prior releases of the same product as the current project, information related to projects that are similar to the project, etc. Projects that are similar may be, for example, of the same or similar type, those having a number of common tasks, etc.

At 102, depending on the type of development cycle (e.g., agile or iterative, waterfall, etc.) the project is divided into various phases and tasks within the phases. Briefly, the waterfall model is a sequential process for the creation of software, in which development is seen as flowing steadily downwards like a waterfall through the phases of requirements analysis, design, implementation, testing, integration, and maintenance. In contrast, in an iterative software development process the application is developed incrementally in short cycles. Each cycle may contain activities for requirement analysis, software design, implementation and testing.

At 104, the effort may be estimated for each task in the project, as well as for any phases and the project itself. There are many ways to create such estimates, such as using actual duration or complexity of a similar task based on past data.

At step 106, an available task is selected from the set of tasks comprising the project and the selected task is performed. At step 108, the actual effort required to complete the task is gathered. Further, new information associated with this completed or executed task may be gathered. This new information can be used to compute new estimates, which can take advantage of that new data to be more precise, resulting in smaller variances for the subsequent tasks.

Step 110 determines whether more tasks remain. If so, at step 112 the actual information gathered at step 108 is used to create new estimates for all of the remaining tasks, as well as any remaining phases and the project as a whole. The procedure returns to step 106 and continues in this manner until the project is complete.

As an example, consider a task that has subtasks tasks, as shown in the table below.

| Task # | | Nominal estimate for schedule | Variance on the estimated schedule |
|---|---|---|---|
| 1 | 1a | 3.0 months | 0.75 month$^2$ |
| | 1b | 5.0 months | 0.25 month$^2$ |
| | | 8.0 months | 1.86 month$^2$ |

For simplicity sake, we assume that the distribution on both tasks 1a and 1b is a triangular distribution, and that they are both symmetric. As known to a person of ordinary skill in probability theory and statistics, a triangular distribution refers to a continuous probability distribution with lower limit L, a mode or nominal value N, and upper limit U, where U>L, and L<=N<=U. In this example, task 1a has nominal value of 3, upper bound of 5.1213, and lower bound of 0.8787. Task 1b has nominal value of 5, upper bound of 6.225, and lower bound of 3.775. This yields an overall estimate on task 1 of 8.0 months, with a variance of 1.86 month$^2$. Variance appears as month$^2$ (month squared) because for a triangular distribution with lower bound L, nominal N, and upper bound U, the variance is computed as $((U-N)^2+(N-L)^2+(U-N)(N-L))/18$, as known to a person of ordinary skill in probability theory and statistics.

In the above example, if task 1a is completed in 2.2 months, we can now update the estimate for task 1 taking into account this new information. There are several methods for doing this; one method is to use the known value of 2.2 months in conjunction with the estimate for 1b. This will give an updated time for task 1 of 7.2 months with a variance of 0.25 month$^2$ (the variance remaining comes solely from 1b, as we now know the actual value for 1a, that is, variance associated with task 1 is zero). Techniques also exist for updating the estimates of future tasks using the actual values from similar tasks that have been completed. This will then allow us to update the overall task in a more sophisticated way. As an example, suppose that task 1b was known to be similar in content and complexity to task 1a. This information can be determined via automatic examination of task properties, or it can be provided by the user. Given the information, we can use the information regarding the actual length of task 1a to update our expectation as to how long 1b will take. For instance, task 1a took 2.2 months, but was estimated at 3.0 months. Task 1b is estimated at 5.0 months. Because it is similar to 1a, we could scale this estimate by 2.2/3.0, which would give an estimate of 3.67 months. The scaling can also take variance into account. For example, the standard deviation of task 1a is 0.8660 (the square root of the variance). This means that the one standard deviation range of the expected value for completing the task goes from 2.134 to 3.866. We could use this information to determine scaling for task 1b, whose range for one standard deviation goes from 4.5 to 5.5. Because the low end of task 1a is 2.134, and it came in at 2.2, we could scale from the low end of task 1b as follows: 4.5*2.2/2.134. This gives an estimate for task 1b of 4.64. We have presented two examples of scaling, but techniques such as this can be combined to rely on multiple factors and multiple actual values.

The variance management approach described above leverages different kinds of information that can be used to improve estimates as the project proceeds. This information becomes available at different stages of the project life cycle. One example is the monitored difference between previous estimations and ongoing actual values in order to progressively reduce the variance in estimates of future tasks, phases, or the project as a whole. In one embodiment, an estimate is treated as an artifact that goes through different states in its lifecycle with its variance continuously changing or reducing as more information becomes available. This approach allows for better management of resources, increased value delivery and reduction of risks.

Figure 2:
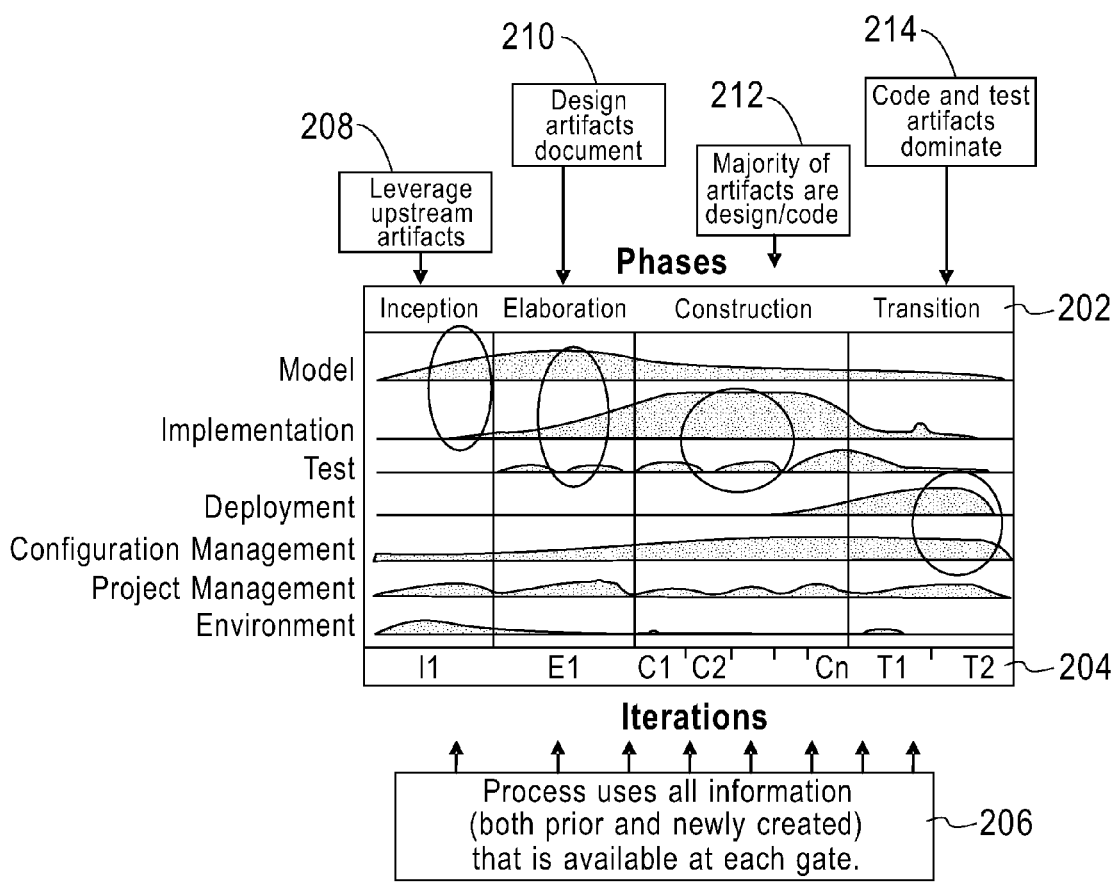
FIG. 2 illustrates leveraging new information that becomes available in a typical development project in one embodiment of the present disclosure.

In addition to more information such as actual values becoming available as tasks get completed, new information can also be extracted from artifacts that get created. Some examples of artifacts that get created on completion of tasks may include, but are not limited to, requirements documents, design documents, source code, etc. Such information can further help in variance management. We consider design models as an example. Teams creating systems frequently build models that describe the design of the system. Furthermore, these models are often built using common design patterns. Given a design model, we can extract information and patterns from it that can be compared with the models of known completed projects whose actual development times are known. We can gather information from the projects that have similar models and patterns. This information can then be used in a way similar to the task scaling approach outlined on the previous page to refine estimates and their variances. FIG. 2 illustrates leveraging new information that becomes available in a typical development project. A project may be classified into different phases such as inception, elaboration, construction and transition as shown at 202. Each phase may in turn have one or more tasks associated with it, for example, model, implementation, test, deployment configuration management, project management, environment, shown in FIG. 2. The phases may be further broken down into iterations, as shown at 204. For example, the construction phase 212 includes C1 and C2 iterations. The Transition phase 214 includes T1 and T2 iterations. The transition between different phases and iterations may be referred to as gates. At each gate, estimation may be performed or updated. As each discrete task actually completes, new information is collected, new artifacts are available, and new estimates can be computed based on the new information shown at 206. New information may be new or revised design documents, requirements documents, information about defects discovered during the running of the task, etc. This information may be used to further revise estimates for the remaining tasks and the entire project plan. For instance, a revised design document could mean different resources needed for the next task, for example, the implementation task of that design.

At inception stage of the project, upstream artifacts such as requirements and initial models may be used to predict the estimation for the entire project as shown in 208. At elaboration phase of the project, new information such as design artifacts that become available may be used to revise the estimates for the remaining tasks (e.g., construction and transition) and the entire project plan as shown in 210. Similarly, at construction phase of the project, more new information such as design and code artifacts that become available may be used again to revise the estimates for the remaining tasks (e.g., transition) and the entire project plan, as shown in 212. At transition phase (shown in 214) of the project, code and test artifacts that become available may be used to further revise the estimates.

While the above examples showed determining estimation and variance in relation to project effort, the method and system of the present disclosure may be used to determine estimation and variance on any other parameters associated with project or product planning. Examples include, but are not limited to, cost, quality, resources needed, profit, revenue, or any other parameters or attributes that affect project planning. Further, while the above examples showed determining estimation and variances of projects divided into tasks, subtasks and phases, the method and system of the present disclosure may perform estimation and determine variances at any level of granularity in the project.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of determining estimation variance associated with project planning, comprising:
    obtaining information associated with a project, said project comprising a plurality of tasks;
    determining, by a processor, initial estimates and estimate variances of the plurality of tasks from the information;
    obtaining actual measurements associated with a selected task from the plurality of tasks after said selected task is executed;
    computing a difference between an initial estimate associated with the selected task and the actual measurements as the project progresses;
    revising, using the computed difference and the estimate variances, the initial estimates associated with remaining one or more tasks in the project, wherein the revising is further based on a design document created based on executing the selected task of the project; and
    determining estimate variances of said remaining one or more tasks based on the revised estimates,
    wherein the estimate variances include a variance of a statistical estimate computed as an average deviation of the statistical estimate from its estimated mean, said estimate variances including a measure of uncertainty in associated estimates,
    the method further comprising monitoring differences between previous estimations and ongoing actual values at different stages of a project life cycle as the project progresses.

2. The method of claim 1, further including:
    collecting new information produced by said one or more tasks that are executed;
    revising the estimate and variance of said one or more remaining tasks based on the new information.

3. The method of claim 2, wherein the new information includes any tangible artifact produced during the execution of a project including at least one or more of revised design document, requirements documents, or information associated a defect discovered during the running of the selected task or combinations thereof.

4. The method of claim 1, further including:
    determining estimate and estimate variance for the project based on the estimates and variance for the plurality of tasks that make up the project.

5. The method of claim 1, further including:
    presenting the estimation variance as a measure of risk to be used in project planning and management.

6. The method of claim 1, wherein the estimation variance is determined for the creation, design, installation, development, deployment, or maintenance activities of a project, or combinations thereof.

7. The method of claim 1, wherein said plurality of tasks are associated with software, hardware, or services, or combinations thereof.

8. The method of claim 1, wherein the information obtained includes actual data associated with one or more past projects associated with said project.

9. The method of claim 1, further including repeating the steps of obtaining, computing, revising and determining estimate variances, until all of the plurality of tasks have been executed, and wherein the estimate variances are progressively reduced for subsequent tasks.

10. A system for determining estimation variance associated with project planning, comprising:
a processor operable to identify a plurality of tasks associated with a project and determine an initial estimate and variance associated with completing each of the plurality of tasks, the processor further operable to collect actual measurements resulting from executing one or more of the plurality of tasks as the project progresses and to revise one or more initial estimates associated with rest of the plurality of tasks not yet executed in the project, based on the actual measurements and the variance associated with completing each of the plurality of tasks, wherein the processor revises said one or more initial estimates further based on a design document created based on said executing of said one or more of the plurality of tasks, the processor further operable to determine estimation and variance of the project based on the revised estimates, the processor further operable to monitor differences between previous estimations and ongoing actual values at different stages of a project life cycle as the project progresses,
wherein the variance includes a variance of a statistical estimate computed as an average deviation of the statistical estimate from its estimated mean, said variance representing a measure of uncertainty in the estimation, and wherein the variance is continuously reduced through the lifecycle of the project.

11. The system of claim 10, wherein the processor is further operable to collect new information that becomes available as a result of executing said one or more tasks and to use the new information to revise one or more initial estimates associated with rest of the plurality of tasks not yet executed.

12. A non-transitory program storage device readable by a machine, tangibly embodying a program of instructions executable by the machine to perform a method of determining estimation variance associated with project planning, comprising:
obtaining information associated with a project, said project comprising a plurality of tasks;
determining initial estimates and estimate variances of the plurality of tasks from the information;
obtaining actual measurements associated with a selected task from the plurality of tasks after said selected task is executed;
computing a difference between an initial estimate associated with the selected task and the actual measurements as the project progresses;
revising, using the computed difference and the estimate variances, the initial estimates associated with remaining one or more tasks in the project, wherein the revising is further based on a design document created based on executing the selected task of the project; and
determining estimate variances of said remaining one or more tasks based on the revised estimates,
wherein the estimate variances include a variance of a statistical estimate computed as an average deviation of the statistical estimate from its estimated mean, said estimate variances including a measure of uncertainty in the initial estimate,
the method further comprising monitoring differences between previous estimations and ongoing actual values at different stages of a project life cycle as the project progresses.

13. The non-transitory program storage device of claim 12, further including:
collecting new information that becomes available as a result of executing said one or more tasks.

14. The non-transitory program storage device of claim 13, further including:
using the new information to revise one or more initial estimates associated with rest of the plurality of tasks not yet executed.

15. The non-transitory program storage device of claim 12, further including:
determining estimate and estimate variance for the project based on the estimates and variance for the plurality of tasks that make up the project.

16. The non-transitory program storage device of claim 15, further including:
presenting the estimation variance for the project as a measure of risk to be used in project planning and management.

17. The non-transitory program storage device of claim 12, further including repeating the steps of obtaining, computing, revising and determining estimate variances, until all of the plurality of tasks have been executed.

* * * * *